Figure 5:
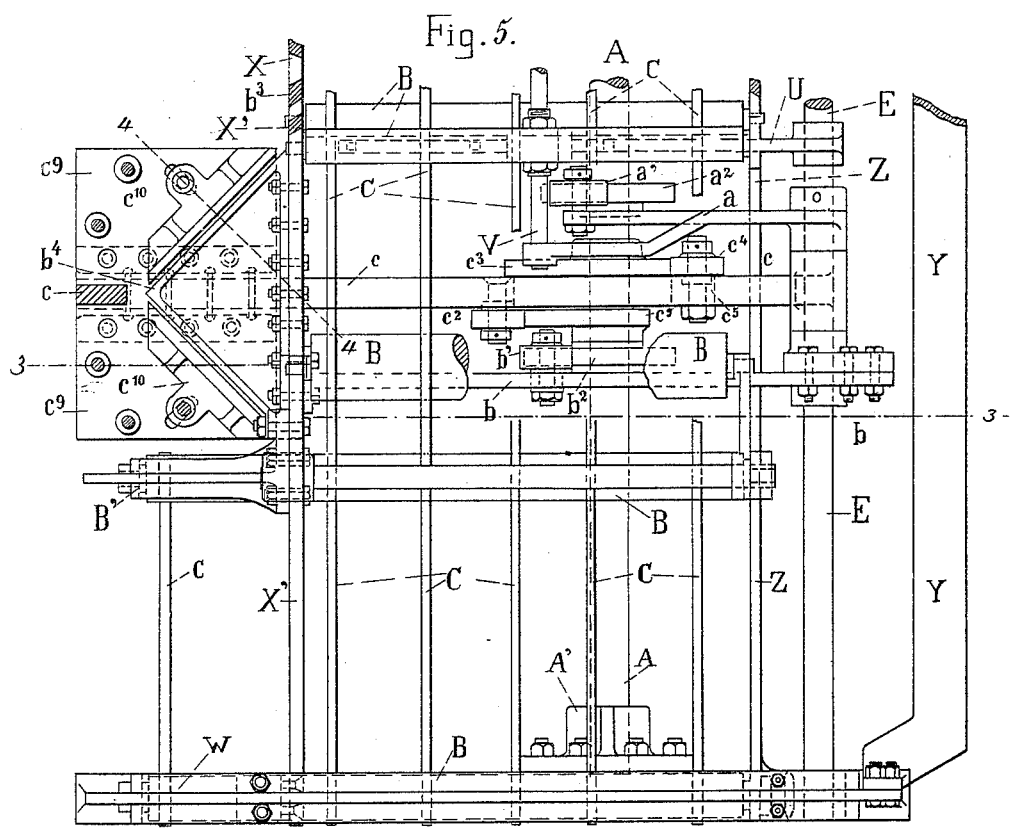

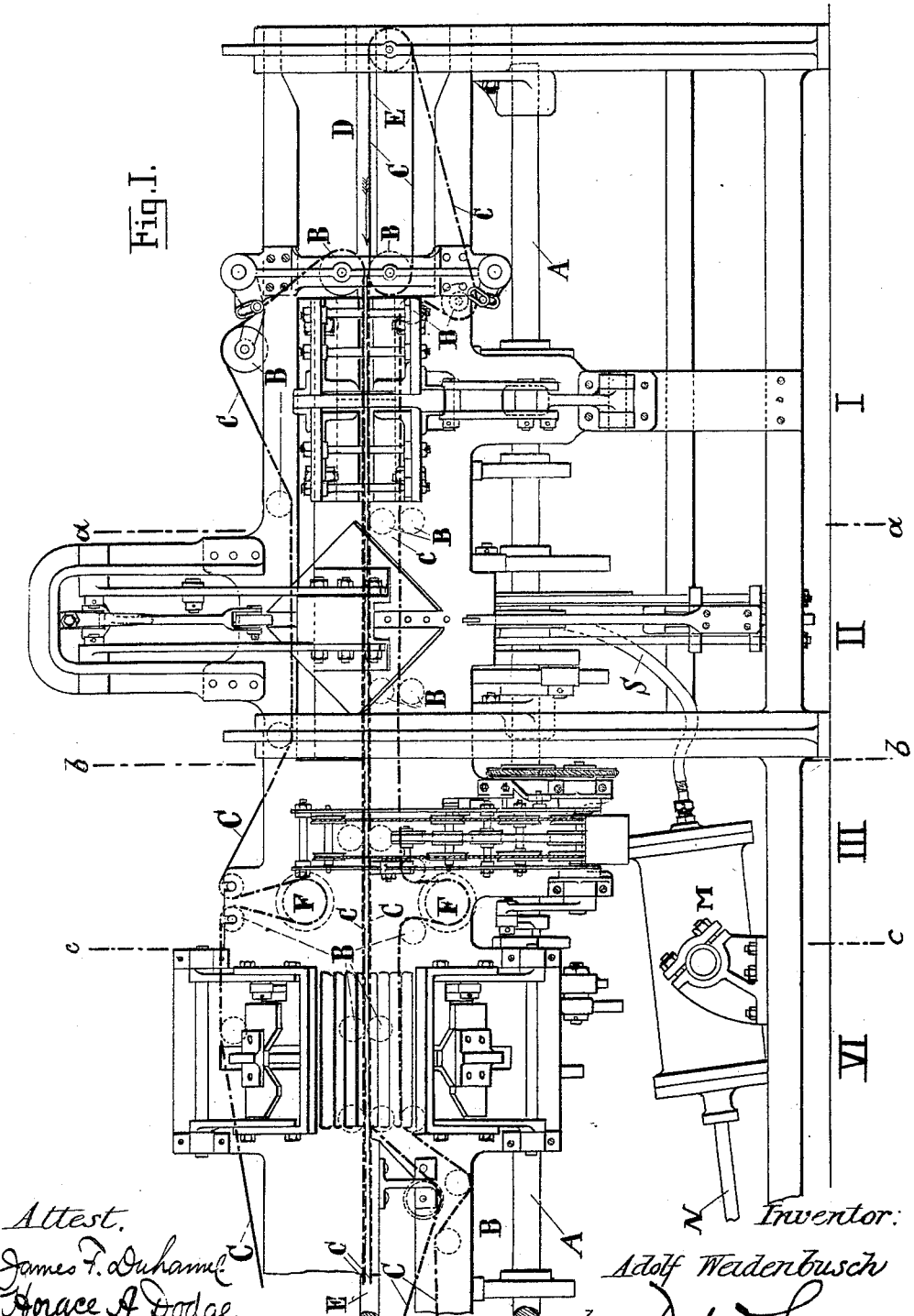

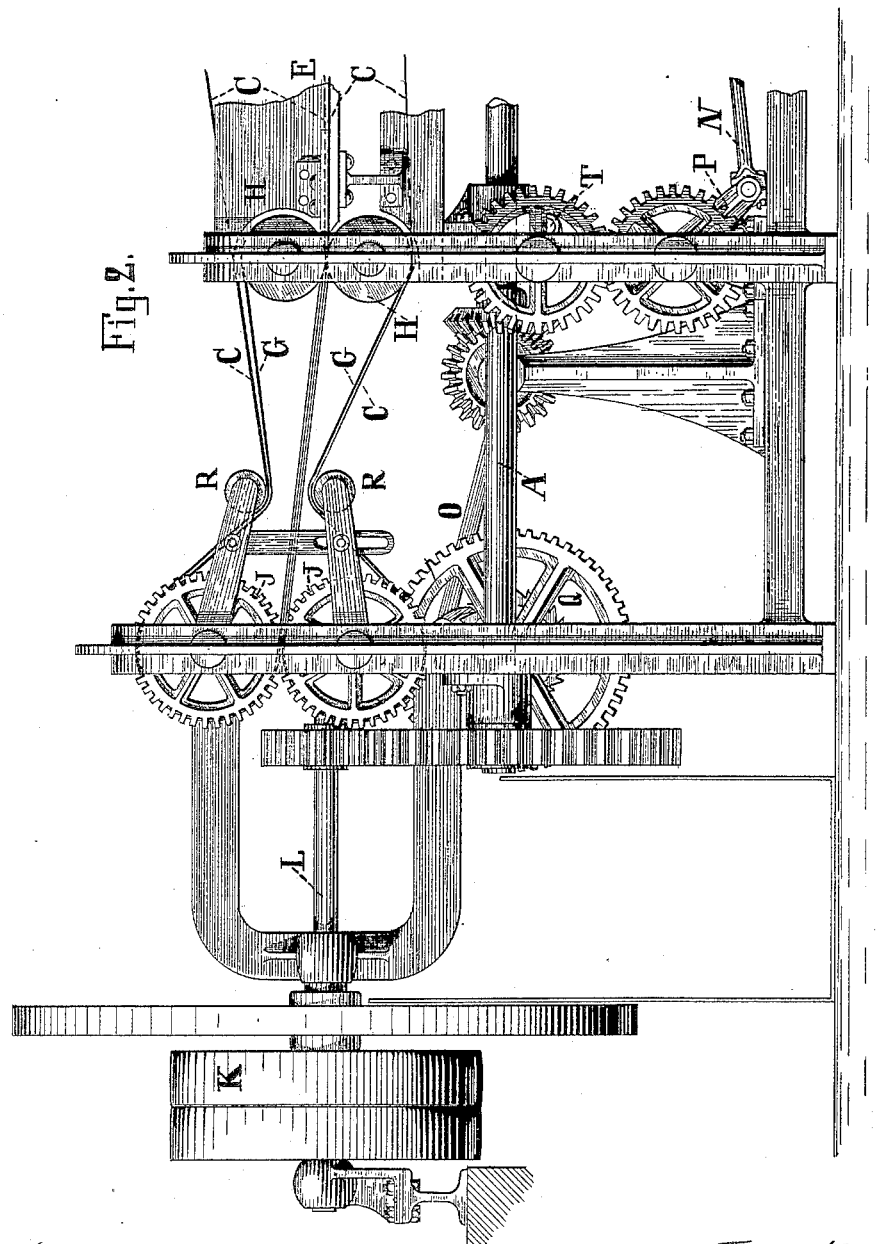

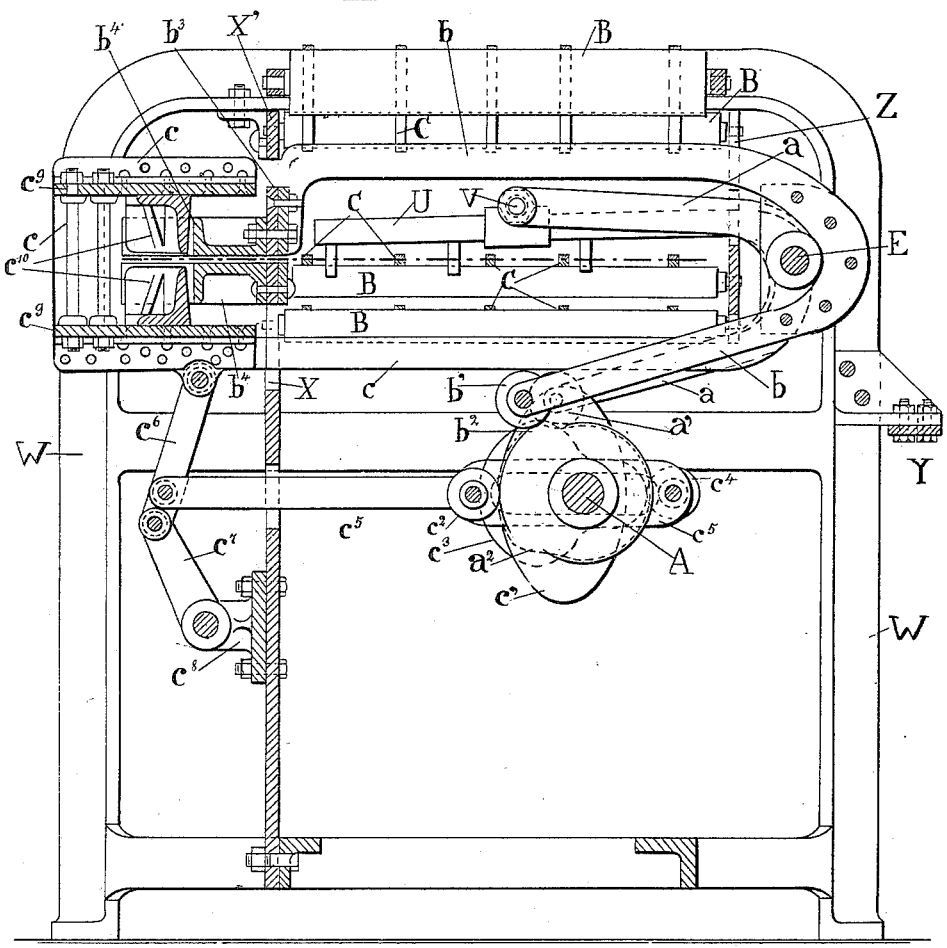
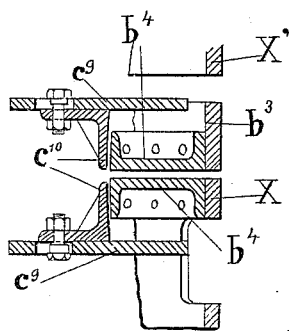

(No Model.) 17 Sheets—Sheet 4.
A. WEIDENBUSCH.
MACHINE FOR MAKING PAPER SACKS.
No. 424,742. Patented Apr. 1, 1890.

Attest.
James F. Duhamel.
Horace A. Dodge.

Inventor.
Adolf Weidenbusch
by Dodge Sons,
Attorneys.

(No Model.) 17 Sheets—Sheet 5.

A. WEIDENBUSCH.
MACHINE FOR MAKING PAPER SACKS.

No. 424,742. Patented Apr. 1, 1890.

Attest:
James F. Duhamel
Horace A. Dodge

Inventor.
Adolf Weidenbusch
by Dodge & Sons
Attorneys.

(No Model.) 17 Sheets—Sheet 6.

A. WEIDENBUSCH.
MACHINE FOR MAKING PAPER SACKS.

No. 424,742. Patented Apr. 1, 1890.

Attest.
James F. Duhamel
Horace A. Dodge.

Inventor
Adolf Weidenbusch
by Dodge Sons,
Attorneys (No Model.) 17 Sheets—Sheet 7.
A. WEIDENBUSCH.
MACHINE FOR MAKING PAPER SACKS.

No. 424,742. Patented Apr. 1, 1890.

(No Model.)  17 Sheets—Sheet 9.

A. WEIDENBUSCH.
MACHINE FOR MAKING PAPER SACKS.

No. 424,742.  Patented Apr. 1, 1890.

Attest  
James F. Duhamel  
Horace A. Dodge.

Inventor  
Adolf Weidenbusch  
by Dodge & Sons  
Attorneys (No Model.)
17 Sheets—Sheet 11.

A. WEIDENBUSCH.
MACHINE FOR MAKING PAPER SACKS.

No. 424,742.
Patented Apr. 1, 1890.

Attest:
James T. Duhamel.
Horace A. Dodge.

Inventor.
Adolf Weidenbusch
by Dodge & Son,
Attorneys.

(No Model.) 17 Sheets—Sheet 13.

A. WEIDENBUSCH.
MACHINE FOR MAKING PAPER SACKS.

No. 424,742. Patented Apr. 1, 1890.

Attest.
James P. Duhamel.
Horace A. Dodge.

Inventor
Adolf Weidenbusch
by Dodge Sons,
Attorneys (No Model.) 17 Sheets—Sheet 14.
A. WEIDENBUSCH.
MACHINE FOR MAKING PAPER SACKS.
No. 424,742. Patented Apr. 1, 1890.
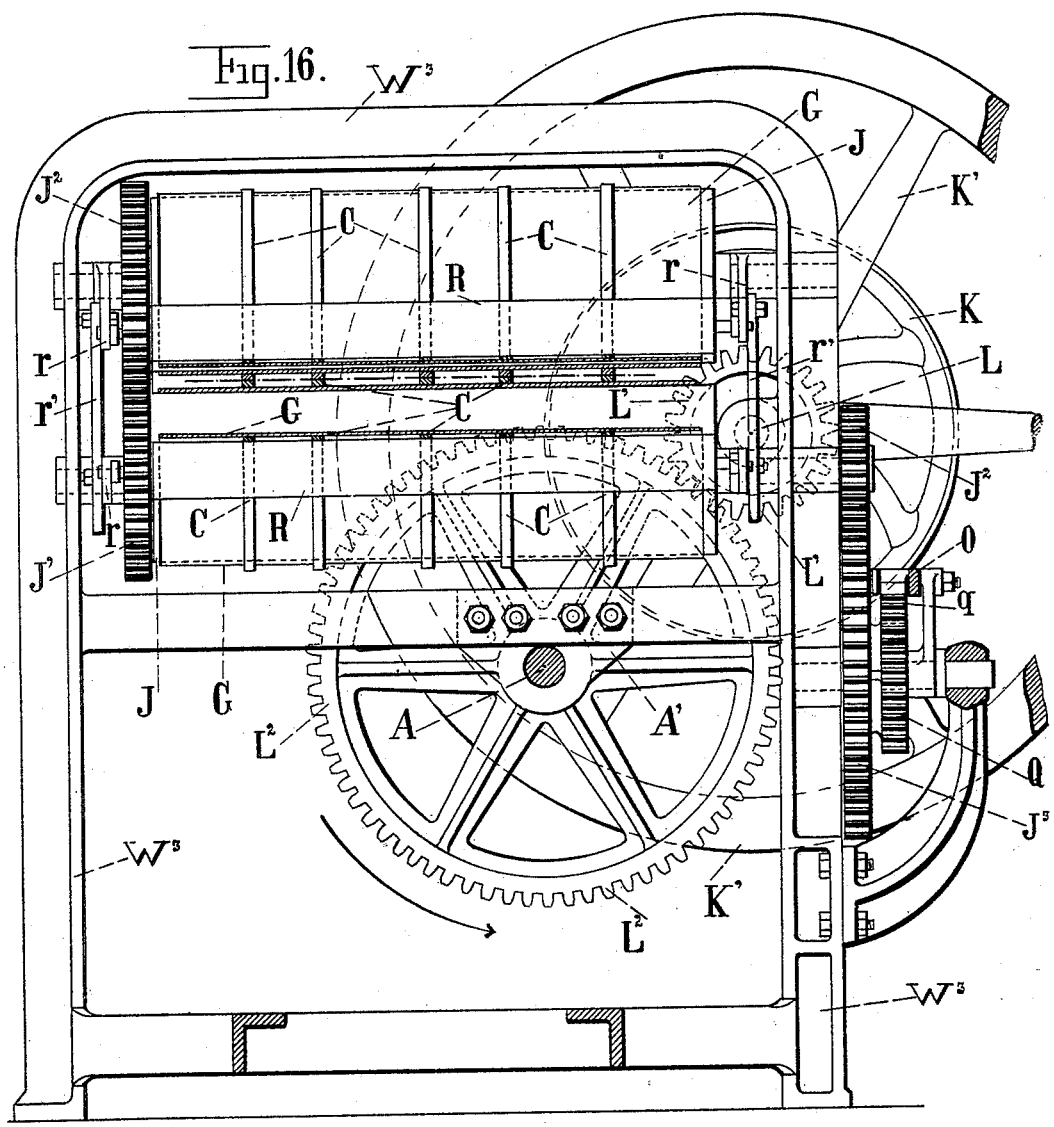
Attest.
James F. Duhamel
Horace A. Dodge.
Inventor.
Adolf Weidenbusch
by Dodge Sons,
Attorneys.

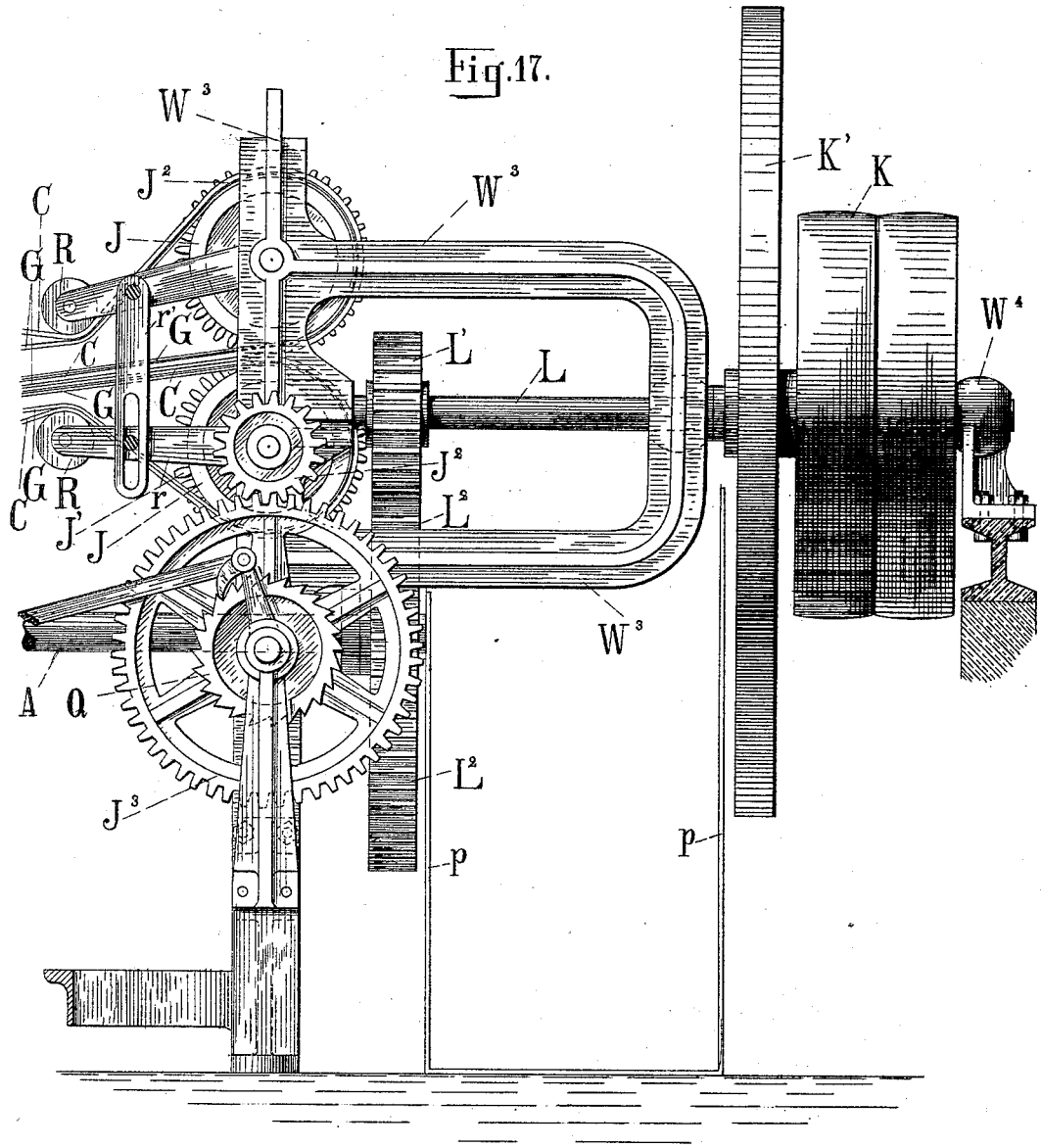

(No Model.) 17 Sheets—Sheet 16.
A. WEIDENBUSCH.
MACHINE FOR MAKING PAPER SACKS.
No. 424,742. Patented Apr. 1, 1890.
Fig. 18.ᵇ    Fig. 18.
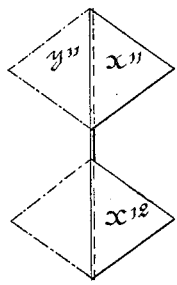
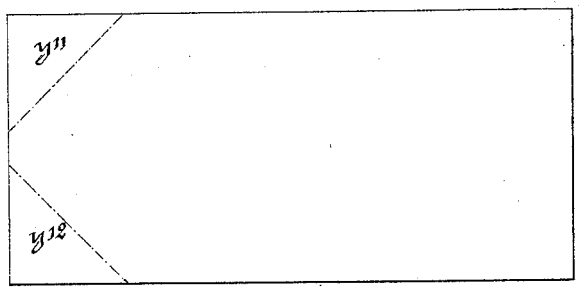
Fig. 18.ᵃ
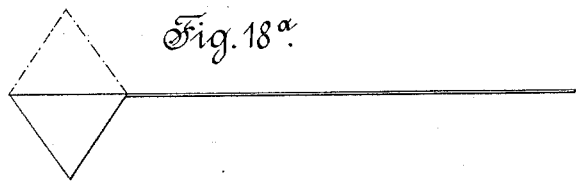
Fig. 19.    Fig. 19.ᵃ
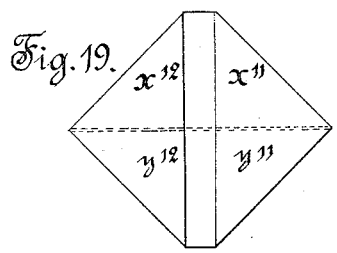
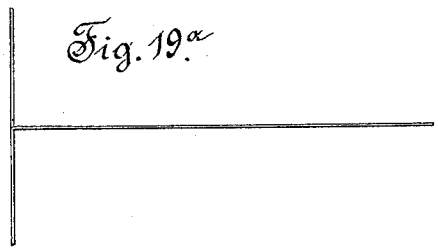
Fig. 20.
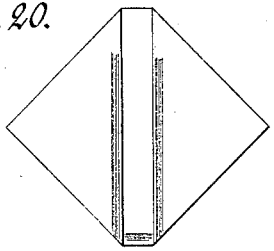
Witnesses:
Joseph Enrath
Paul Fischer
Inventor:
Adolf Weidenbusch
by
Muuratah
Attys.

(No Model.)  17 Sheets—Sheet 17.
A. WEIDENBUSCH.
MACHINE FOR MAKING PAPER SACKS.
No. 424,742.  Patented Apr. 1, 1890.
Fig. 21.  Fig. 21ª.
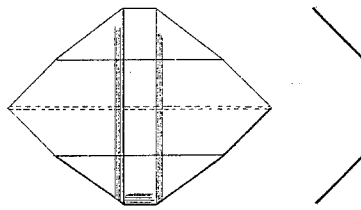
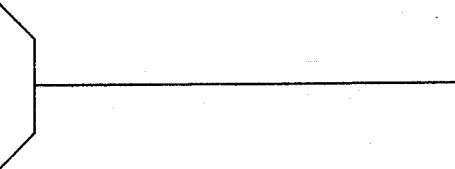
Fig. 22.  Fig. 22ª.
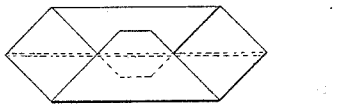
Fig. 23.
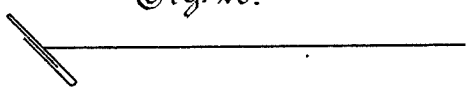
Fig. 24.
Witnesses:
Joseph Curath.
Paul Fischer
Inventor:
Adolf Weidenbusch
by
Attys.

United States Patent Office.

ADOLF WEIDENBUSCH, OF DARMSTADT, HESSE, GERMANY.

MACHINE FOR MAKING PAPER SACKS.

SPECIFICATION forming part of Letters Patent No. 424,742, dated April 1, 1890.

Application filed March 23, 1888. Serial No. 268,311. (No model.) Patented in Germany August 3, 1886, No. 41,433, and in England January 17, 1888, No. 730.

*To all whom it may concern:*

Be it known that I, ADOLF WEIDENBUSCH, of Darmstadt, in the Grand Duchy of Hesse and German Empire, have invented a new and useful Machine for Making Paper Sacks, (for which I have received Letters Patent in England, No. 730, dated January 17, 1888, and in Germany, No. 41,433, dated August 3, 1886,) of which the following is a specification, reference being had therein to the accompanying drawings.

This invention relates to machinery in which prepared paper tubes previously cut into certain lengths are made into paper bags of the description known in the trade as "square" or "block" bottomed paper bags; and it consists in the arrangements and combinations of parts whereby the several operations connected with the manufacture of the said bags are mechanically performed, as hereinafter explained.

Figure 6:
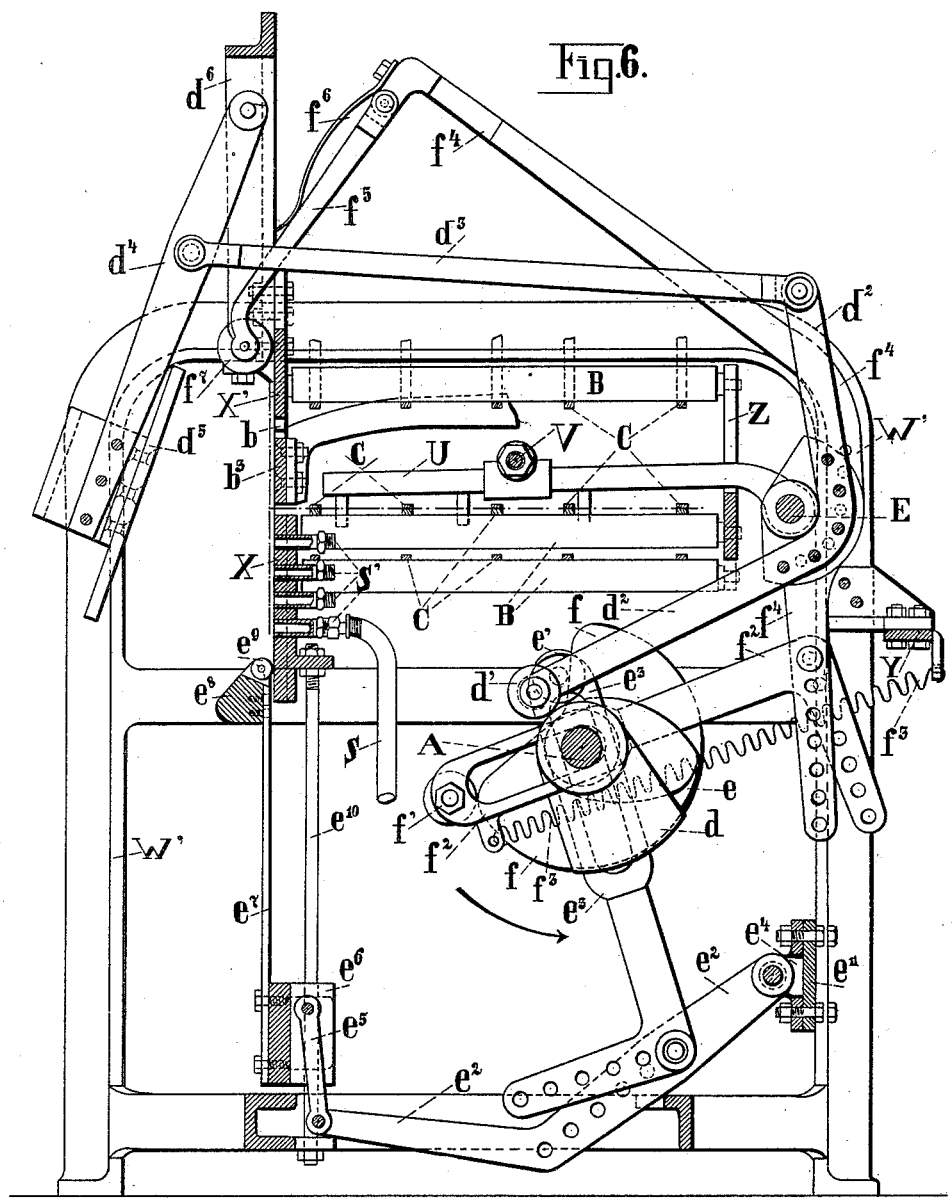
Figure 7:
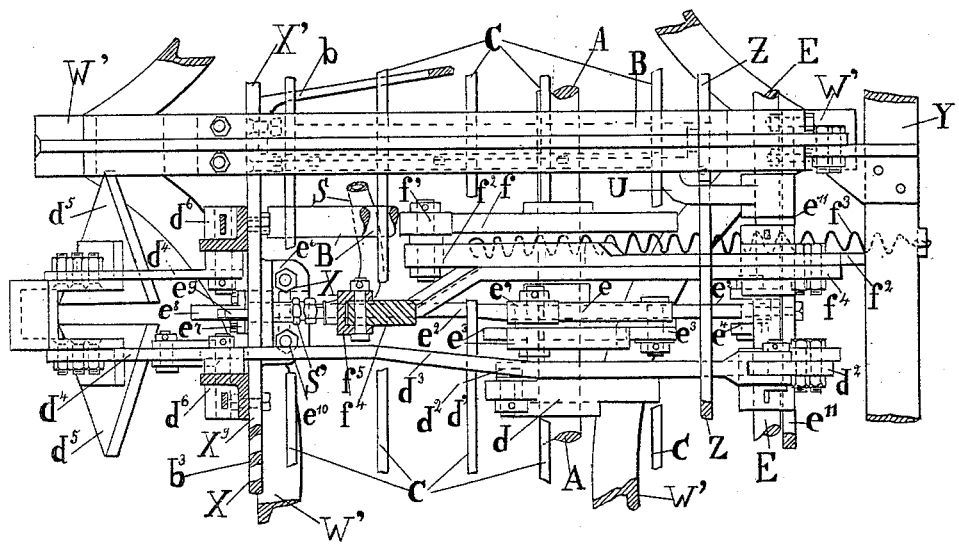
Figure 8:
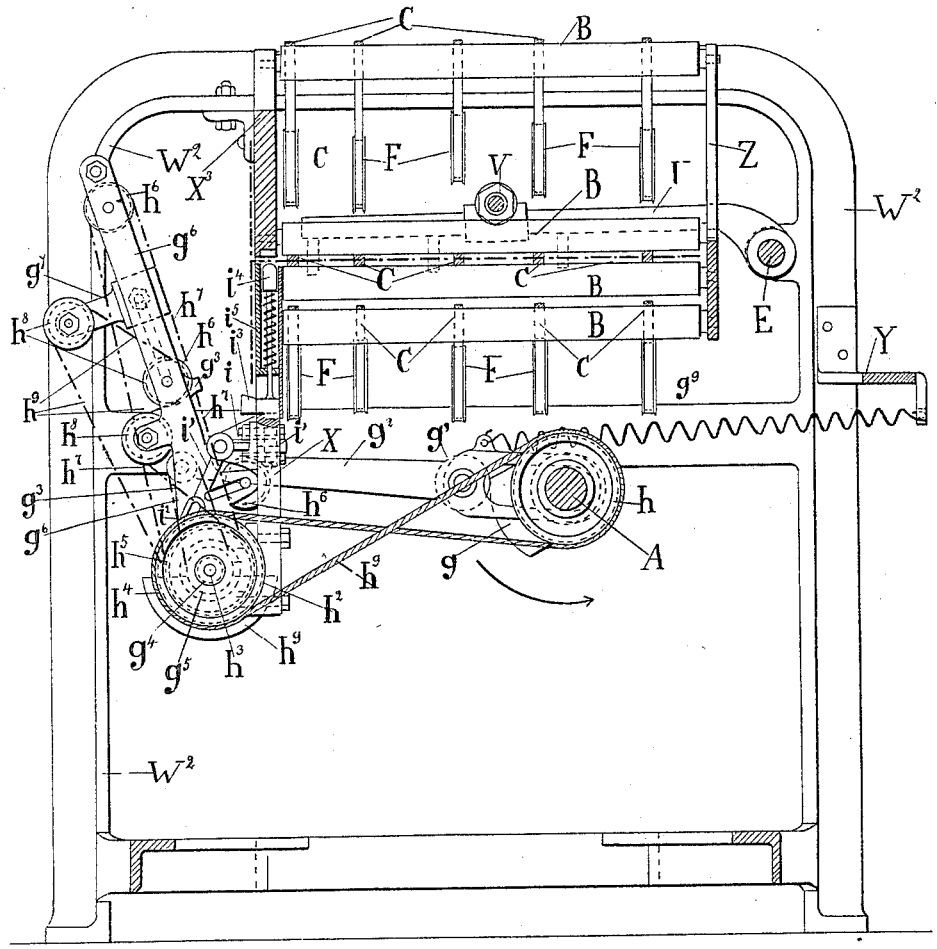
Figure 9:
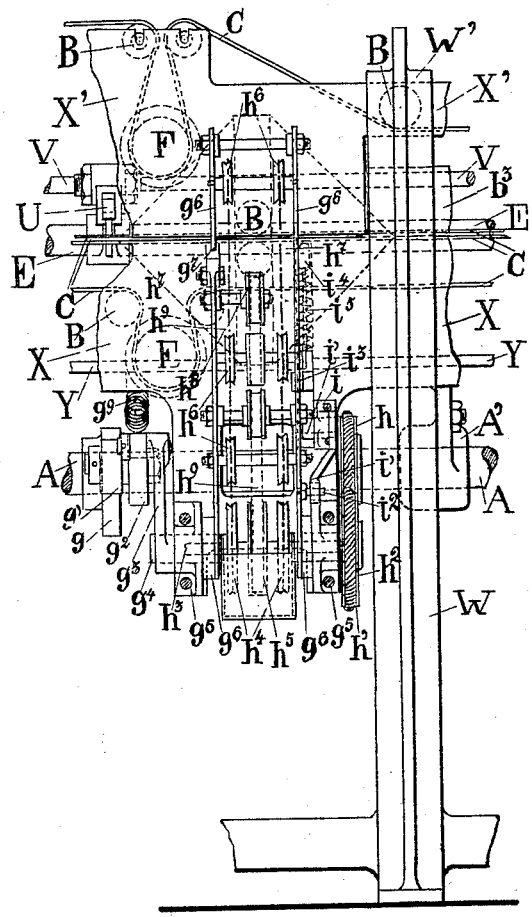
Figure 10:
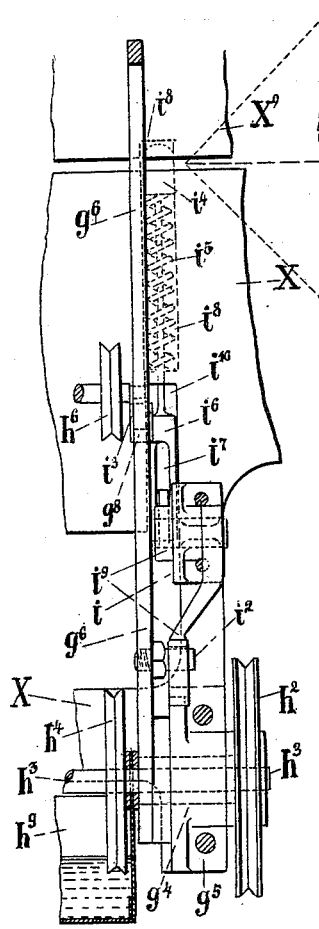
Figure 11:
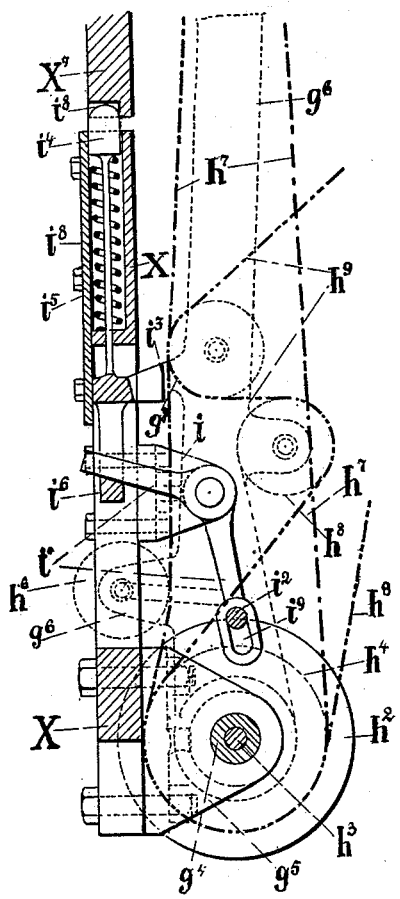
Figure 12:
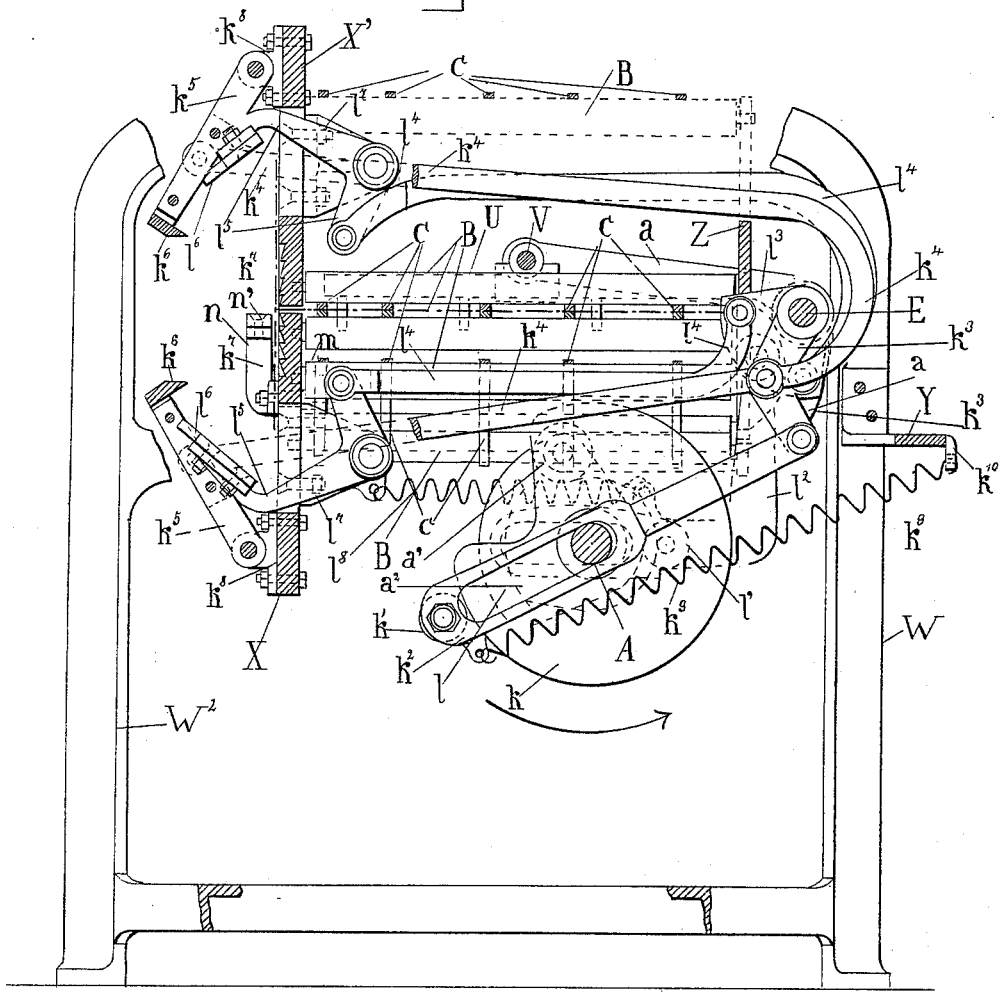
Figure 13:
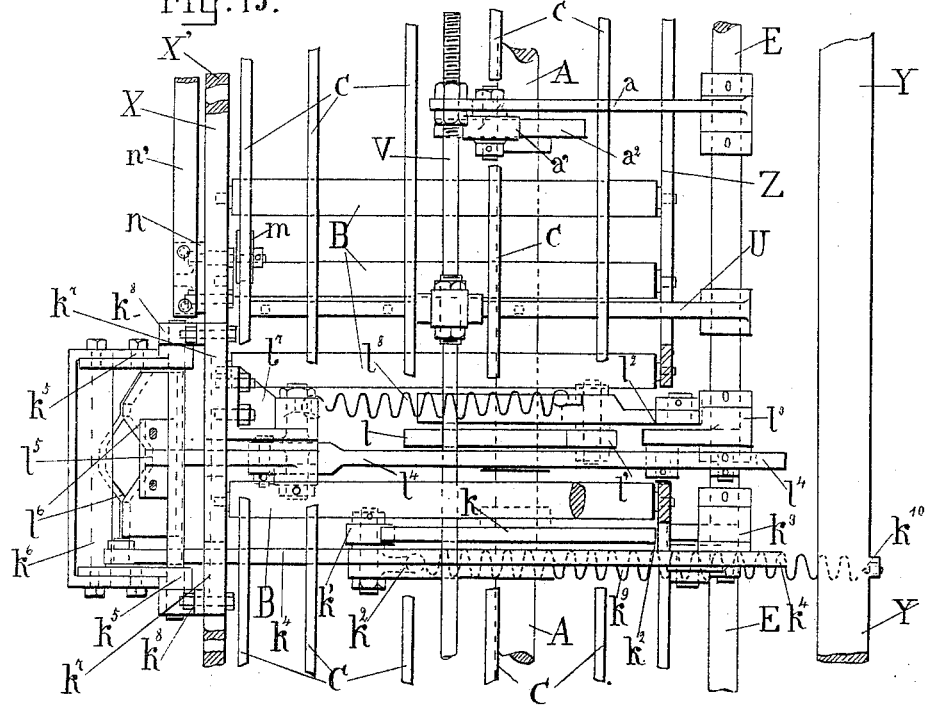
Figure 14:
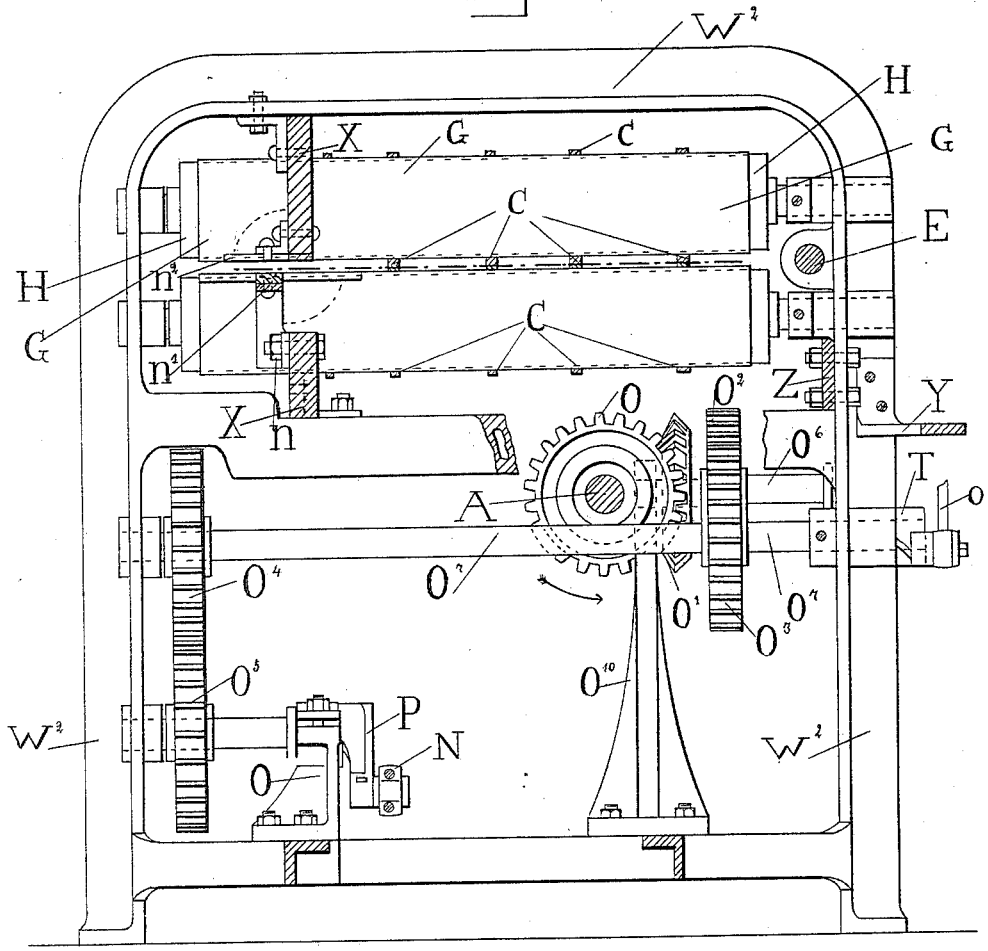
Figure 15:
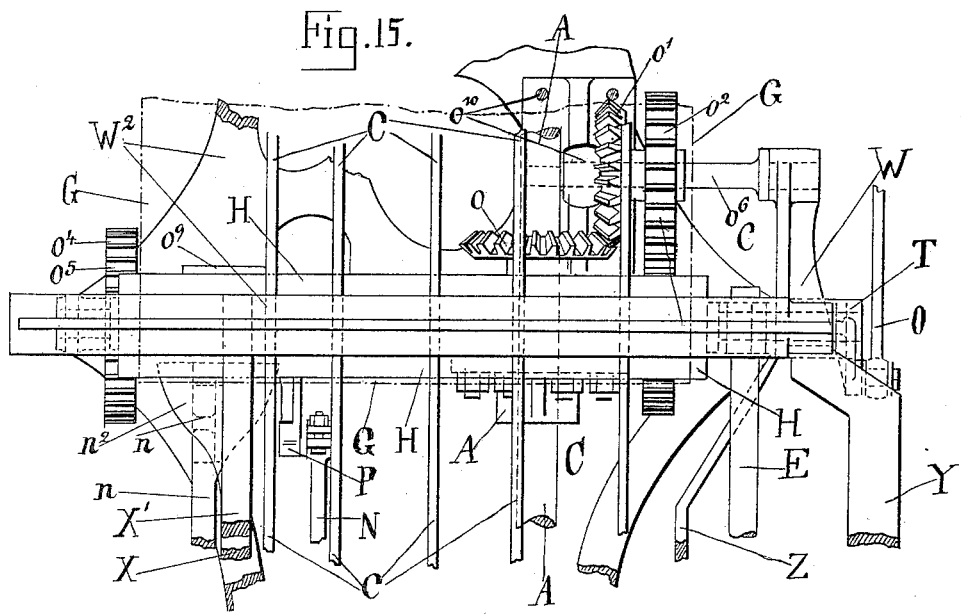

Figures 1 and 2 of the accompanying drawings illustrate the general arrangement of a machine according to this invention in side elevation, Fig. 2 being simply a continuation of Fig. 1, the drawing being divided along the line $\delta\ \delta$, Fig. 1. Figs. 3 to 5 illustrate that part of the machine which is marked I in Fig. 1, and by which the paper tube is creased on two sides. Fig. 3 represents a transverse section along the line $\zeta\ \zeta$, Fig. 5. Fig. 4 shows the creasing device in section along the line $\eta\ \eta$ in Fig. 5, which represents this part of the machine, corresponding to I, Fig. 1, in plan, certain parts being represented as broken away or removed, in order to show the arrangements beneath them more clearly. Figs. 6 and 7 illustrate that part of the machine marked II in the general view, Fig. 1, and which is employed to fold the paper tube after it has been creased in the preceding part of the machine. Fig. 6 is a transverse section taken along the line $a\ a$, Fig. 1, illustrating this arrangement; and Fig. 7 is a plan of the same, certain parts being removed to avoid confusion. Figs. 8 to 11 illustrate the third section of the machine, marked III in the general view, being the pasting mechanism, which applies paste to certain parts of the bottom of the paper tube creased in the preceding mechanism. Fig. 8 represents this part of the machine in end elevation, partly in section, (along the line $\beta\ \beta$, Fig. 1,) Fig. 9 being a side elevation of the same. Figs. 10 and 11 illustrate details of the pushing mechanism, drawn to a larger scale, and show an arrangement, hereinafter described, which throws the pasting mechanism out of action when no paper is supplied to the machine. Figs. 12 and 13 relate to that part of the machine marked IV in Fig. 1, wherein the pasted ends of the paper tube are creased along the required lines and pressed down to form the bag-bottom. Fig. 12 represents a section along the line $\gamma\ \gamma$, Fig. 1; and Fig. 13 shows this part of the machine in plan. Figs. 14 and 15 represent, respectively, an end elevation, partly in section, along the line $\delta\ \delta$ and a plan of that part of the machine marked V in the general view, Fig. 2. In this part of the machine the bag-bottom which previously stood at right angles to the tube forming the sides is turned down, so that the bag is flattened and enabled to pass between rollers and endless cloth bands or aprons. Figs. 16 and 17 illustrate the driving-gear of the machine indicated at VI, Fig. 2, Fig. 16 being an end elevation and Fig. 17 a side elevation, seen from the opposite side to the view in Fig. 2. Figs. 18 to 24 illustrate the progressive stages through which the paper tube is caused to pass in the course of its conversion into a bag. Figs. 18, 18$^a$, and 18$^b$ show how the paper blank is creased in section I of the machine, Figs. 3 to 5. Fig. 18 represents the bag, viewed from above, as it lies in the machine. Fig. 18$^a$ is a side view, and Fig. 18$^b$ an end view, of the same. Figs. 19 and 19$^a$ illustrate the next stage, which is reached in passing through section II of the machine, Figs. 6 and 7, wherein the creases previously formed are opened to form the diamond fold, and the bag-bottom presents the form indicated in Fig. 19, which represents the front end of the bag, Fig. 19$^a$ being a side view of the same. Fig. 20 shows how the paste is applied in the pasting apparatus, Figs. 8 to 11, the parts covered with paste being shaded. Figs. 21 and 21$^a$ represent an end and side elevation of the bag in the next stage of manufacture performed by the creasing mechanism illustrated in Figs. 12 and 13. Figs. 22 and 22ª show how the other or finishing folds in the bottom of the bag are made in the mechanism illustrated in Figs. 12 and 13, Fig. 22 being an end view, and Fig. 22ª a side elevation, of the bag with the bottom completely formed. Fig. 23 shows the bag in the act of being flattened in the mechanism illustrated in Figs. 15 and 16, and Fig. 24 represents the bag in the completely-flattened form in which it leaves the machine.

All the parts of the machine are connected together, so as to be dependent on one another and act in concert, receiving motion from a pulley K, Figs. 2 and 17. The paper blank is carried through the machine on endless bands or aprons, and the machine is entirely automatic in its action, so that no hand labor is required. The blanks are forwarded through the machine by means of endless carrying-bands C, Figs. 1, 2, and 5, passing over rollers B, being maintained in the proper state of tension by means of tension-rollers F, Fig. 1, and having an intermittent motion imparted to them from the driving mechanism.

The intermittent motion of the carrying-bands is produced as follows: The driving-pulley K, Figs. 2, 16, and 17, drives a shaft L, carrying a pinion L', which imparts a continuous rotary motion to a toothed wheel L², fixed on a driving-shaft A, extending from one end of the machine to the other, Figs. 1 and 2. This driving-shaft A carries a bevel-wheel $o$, Figs. 14 and 15, gearing with a corresponding wheel $o'$. From this wheel $o'$ the rotary motion is transmitted through a shaft $o^6$ to a toothed wheel $o^2$, Figs. 14 and 15, which drives a toothed wheel $o^3$, Fig. 14, and shaft $o^7$. The shaft $o^7$ is provided at its right-hand extremity, Fig. 15, with a crank T, working a connecting-rod O, connected to a crank $q'$, Figs. 16 and 17, carrying a pawl $q$. The crank $q'$ acts through the pawl $q$ on a ratchet-wheel Q. The throw of the crank T is less than that of the crank $q'$, so that the continuous rotation of the crank T produces an oscillating motion of the crank $q'$. This oscillating motion of the crank $q'$ produces an intermittent rotary motion of the ratchet-wheel Q and of a toothed wheel $J^3$, fixed on the same shaft, whence the same movement is transmitted to a toothed wheel $J^2$, fixed upon the shaft of the lower roller of a pair of rollers $J^4$, carrying the forwarding-bands C. The axis of the lower roller carries a toothed wheel $J'$, driving a wheel $J^4$, fixed on the axis of the upper roller, so as to cause the two rollers to rotate in opposite directions at the same peripheral speed with an intermittent motion, by which the bands C and the bag-blanks held between the said bands are propelled through the machine.

The bag-blanks are fed into the machine at D, Fig. 1, whence they travel on the bands C through the different parts of the machine in succession, and in order to insure that the blanks shall be presented to the creasing and other devices in the proper position a feed-comb U, Figs. 3 and 5, is provided, which returns the blanks in the proper position on the traveling bands. The feed-comb is provided with teeth, as shown in the drawings, which, when elevated above the carrying-bands C, enable the blanks to pass, but when lowered, as in Fig. 3, stop the forward motion of the said blanks. The movement of the comb U is derived from a cam $a^2$ on the driving-shaft A, which acts upon a roller $a'$ on the end of a lever $a$, Figs. 3, 5, 12, and 13. The lever $a$ is fixed upon a shaft E, working in bearings on the side frame of the machine, and is connected by a bar V with the comb U, which is pivoted or mounted loosely on the shaft E. When the lever $a$ is raised by the action of the cam $a^2$, the comb is elevated and allows the blanks to pass, and when the lever $a$ descends the comb U blocks the passage of the blanks. During one forward motion of the intermittently-moving bands C the comb U is stationary, so that the blanks are brought close up to and in contact with the comb-teeth. The comb can be adjusted on the bar V by means of screws, so that the feed of the blanks can be adjusted according to their dimensions.

There are two sets of carrying-bands, one above the other, the lower bands being extended at the feed end of the machine for the reception of the blanks at D, Fig. 1.

The first section of the machine—namely, the creasing apparatus indicated at I, Fig. 1—folds the corners of the blank, turning them upward and downward along the lines $y^{11} y^{12}$, Figs. 18, 18ª, and 18ᵇ, so as to prepare the paper for the subsequent folding operations that are necessary to form the bottom of the finished bag. This preliminary creasing is performed by clamping the blank between two triangular-shaped plates, so that the corners of the blank project. These corners are first turned upward and then downward by means of a bar or creaser with a wiping action. The bag-blank, being deposited at D, Fig. 1, upon the carrying-bands C, is carried forward by the intermittent motion of the latter to the creasing mechanism. The paper tube is deposited upon the carrying-bands in such a manner that one end projects, and with this object a special carrying-band C', Fig. 5, is provided, which is arranged outside on the left at B' and supports the free overhanging end of the blank at which the creases are to be made. By these means the paper tube is brought between two plates $b^3$ and X, Figs. 3, 4, and 5, which are provided with three-cornered plates or jaws $b^4$. When the blank is placed by the carrying-bands in the required position relatively to the jaws $b^4$, the upper plate $b^3$, with the jaw $b^4$ attached thereto, descends and clamps the paper between this jaw and the corresponding jaw on the plate X. The downward movement of the plate $b^3$ and jaw $b^4$ is produced by cams $b^2$, fixed on the driving-shaft A. The upper plate $b^3$ extends through the second folding or creasing mechanism, and is connected at both ends with levers $b$, pivoted on the shaft E and provided at their lower extremities with rollers $b'$, bearing against the cams $b^2$, rotating with the driving-shaft A, Figs. 3, 5, and 6. When the jaws $b^4$ are brought together on the paper by the action of these cams, wipers $c^{10}$, Fig. 4, are moved along to the said jaws and caused to fold down the protruding corners of the blank with a wiping action. The upward and downward motion of the wipers is produced by cams $c'\ c^3$, Fig. 5, acting on friction-rollers $c^2\ c^4$ on the ends of bars $c^5$, and rotating with the driving-shaft A, Figs. 3 and 5. By these means reciprocating motion is imparted to the bars $c^5$, which operate toggle-levers $c^6\ c^7$, having their bearing at $c^8$. The toggle-lever $c^6$ is connected to a frame formed by plates $c^9$, carrying the wipers $c^{10}$, and move this frame with the said wipers upward and downward alternately. These wipers are maintained at a certain distance apart by means of vertical bolts or screwed rods, as indicated in Fig. 3. The blank having been clamped in the proper portion between the jaws $b^4$, the corners are creased or bent upward and downward by the movements of the wipers $c^{10}\ c^{10}$, being folded as indicated in Figs. 18, $18^a$, and $18^b$. After the corners have been creased in the manner indicated the upper plate $b^3$ rises with the jaw $b^4$ and releases the blank, which is then by the next forward movement of the carrying-bands C, timed to take place at this moment, carried forward to the next division of the machine. The lower jaw $b^4$ is fixed to the plate X, which forms part of the side frame, being fixed to the frames W W' $W^2$. X' is another side plate fixed over the plate X, and has a portion cut away to allow of the movement of the upper movable jaw $b^4$ and of the plate $b^3$, Figs. 3, 4, and 5. The wipers $c^{10}$ are attached to the plates $c^9\ c^9$ by nuts and bolts working in slots to admit of adjustment of the wipers. A', Fig. 5, is a bearing for the driving-shaft A, and B' is a bearing for the axis of a roller which is made longer than the others to work the extra carrying-band C', Fig. 5.

The mechanism hereinbefore described serves to form the preliminary folds required to prepare the bag-blank for the subsequent operations, the corners being creased both ways, upward and downward, to prepare the bottom edges for being folded in opposite directions. To effect this—that is to say, to impart to the blank the form indicated in Figs. 19 and $19^a$—a folding apparatus, drawn to a larger scale in Figs. 6 and 7, is employed. When the blank leaves the creasing apparatus hereinbefore described, it is forwarded by the carrying-bands C to a second comb U, operated by the shaft E in the same manner as the comb at the entrance to the machine. This comb, likewise marked U in the drawings, Figs. 6 and 7, serves to arrest the forward motion of the blank. The latter passes between the two plates $b^3$ and X, the upper plate $b^3$ being moved upward when the paper tube has arrived at the proper position. With this object the plate $b^3$ is fixed, as hereinbefore described, to the lever-arm $b$, and is operated by a cam $b^2$ on the driving-shaft A, acting on the roller $b^2$. At this time the creased end of the blank protrudes from between the plates X and $b^3$. A number of tubes S' are attached to the lower plate X and communicate through a rubber tube S with an air-pumping cylinder M, Fig. 1. This cylinder exhausts air from the tubes S', so that paper placed over the orifices of these tubes in the lower plate X is pressed against the surface of the plate by suction. The air-pump M is provided with a piston and piston-rod N, which receives motion from a crank P, driven by toothed gear at the delivery end of the machine and operated by the driving-shaft A, Fig. 2. At the head or front of the folding-machine there is provided a plate $d^5$, which presses the folds at the proper time. This presser moves in an arc of a circle and is alternately moved away from and applied against the surfaces of the plates $b^3$ and X, being operated by a lever-arm $d^4$, pivoted to a support $d$. This lever-arm $d^4$ is connected by a connecting-rod $d^3$ to a lever $d^2$, oscillating on the shaft E and provided with a roller $d'$, bearing against a cam $d$ on the driving-shaft A, which is timed to actuate the presser-lever $d^4$ at suitable intervals. The lever-arms $d^2$ are made adjustable within certain limits by means of a loose disk $d^7$, placed on the shaft E, and to which the said lever-arms are adjustably connected, as indicated in Fig. 6. A roller $f^7$ is also provided, which serves to fold over the lower part of the bottom of the paper tube. This roller $f^7$ is operated and caused to move upward and downward alternately by a cam $f$ on the driving-shaft A by the intervention of a roller $f'$ on a lever or arm $f^2$, acting on levers $f^4\ f^5$. The driving-shaft A passes through an elongated opening or slot in the arm $f^2$, and the roller $f'$ on this arm is maintained in contact with the cam $f$ by the action of a spring $f^3$. The arm $f^2$ is capable of adjustment relatively to the lever $f^4$, the said arm and lever being provided with a number of corresponding holes for the reception of a bolt, which connects them together in any required position. By this means the center of the arm $f^2$ can be adjusted within certain limits on the lever $f^4$. The lever-arm $f^5$ is connected to the lever $f^4$ by a joint or hinge, and a spring $f^6$, fixed on the end of the lever $f^4$, as indicated in Fig. 6, causes the roller $f^7$ to bear with a certain amount of pressure against the paper on the surfaces of the plates $b^3$ and X.

The upper part or flap of the bag-bottom is folded or turned back by a roller $e^9$, working in bearings in a reciprocating block or piece $b^8$. The roller $e^9$ is operated by a cam $e$ on the shaft A. This arm acts upon a roller $e'$ on the upper extremity of a lever $e^3$, which is slotted similarly to the lever $f^2$, so as to be capable of moving in the direction of its length upon the shaft A. This lever is pivoted on a lever $e^2$, working on a fixed fulcrum $e^4$, attached to a plate $e^{11}$, projecting from the frame of the machine.

To enable the stroke of the roller $e^9$ to be adjusted or regulated, corresponding parts of the levers $e^2$ and $e^3$ are provided with similar holes for the reception of a bolt forming a pivotal connection capable of adjustment between the said levers. The sliding piece or block $e^8$ is connected by a blade-spring $e^7$ to a sliding head $e^6$, the said spring being so adjusted as to cause the roller to bear with a certain amount of pressure against the surface of the plate X. The sliding head $e^6$ is guided on a bar $e^{10}$, and is connected with the lever $e^2$ by a connecting rod or link $e^5$.

When the blank, which has been operated on as hereinbefore described in the first division of the machine, has been completely forwarded into the second division, it is stopped by the comb U, Fig. 6 and 7, and is clamped by the descent of the plate $b^3$. That part of the blank which projects beyond the front of the plates $b^3$ and X is then turned down by the action of the vertically-reciprocating roller $f^7$ and pressed against the surface of the lower plate X. When the two thicknesses of paper are thus applied against the surface of the plate X, the thickness of paper next to the said plate is continually pressed against the same by the suction of the air-tubes S' and air-pump M. The roller $f^7$ then returns to its upper position, and the outer thickness of paper, not being exposed to the suction of the air-pump, separates from the inner thickness by reason of its inherent elasticity, so that the roller $e^9$, being now caused to ascend, readily enters the opening formed between the two thicknesses of paper and pushes up the outer fold, turning it back against the front of the upper plate $b^3$. The roller $e^9$ is thus caused to pass under the part marked $X^{12}$, Fig. 19, and folds the paper along the creases made in the first division of the machine, causing the blank to assume the form indicated in Figs. 19 and 19$^a$. When the plate $d^5$ has been brought into operation and caused to press down the folds as the roller $e^9$ retires to its lowest position, a suitable opening is formed in the middle of the presser $d^5$ for the passage of the said roller, as indicated in Fig. 7. After the folds of the bag-bottom have been formed, as described, the plate $b^3$ rises slightly and releases the bag-blank, which is then forwarded by the carrying-bands C to the third division of the machine, in which the paste is applied to the folds. A number of tubes S' are provided in different levels in the plate X, which can be connected with the rubber in tube S, in order that the sucking action may be employed in making bags of different sizes.

The third division of the machine forms the pasting apparatus, by means of which paste is applied to the edges of the paper, which are to be subsequently united. This pasting mechanism is illustrated in front and end elevations, partly in section, in Figs. 8 and 9, and Figs. 10 and 11 illustrate details of the same drawn to a larger scale. The arrangement is as follows: The pasting attachment is situated on that side of the machine in which the folded or creased bag-bottom protrudes, and consists of a frame $g^6$, which is automatically moved toward the continuous fixed side plates X X', and through which three pasting-bands are guided over suitable pulleys. The bag-bottom must be pasted at the parts marked with shaded lines in Fig. 20. The two diagonal lines of paste in the two edges of the paper are formed by two pasting-bands $h^7 h^7$, working on pulleys $h^6$ on each side of the frame $g^6$, as indicated in Fig. 9. The short horizontal line of paste is applied by a pasting-band $h^9$, working on rollers $h^8$ in the middle of the frame. These pasting-bands are driven by the main driving-shaft A by means of grooved pulleys $h h^2$ and a cord $h'$. The pulley $h^2$ transmits rotary motion through a shaft $h^3$ to pulleys $h^4$, round which the pasting-bands $h^7$ are passed. The pulleys $h^4$, as well as a central pulley $h^5$, carrying the central pasting-band $h^9$, work in a trough $h^{10}$, partly filled with paste, with which the bands $h^7$ and $h^9$ become saturated. The pasting apparatus turns on trunnions $g^4$ as a center, and is pressed against the bag-bottom at the proper time by the action of a cam or wiper $g$ on the shaft A, which acts on a roller $g'$ on a slotted connecting-rod $g^2$, working on the shaft A, Fig. 8, and connected with a lever-arm $g^3$. The pasting mechanism is brought into action when the bag-blank has been forwarded by the carrying-bands and brought up against a comb U, operated by a rod V. When the cam on the driving-shaft is in the proper position, the pasting apparatus is pressed against the bag-bottom with the end of a spring $g^9$ and the pasting-bands come in contact with the paper and deposit a sufficient amount of paste thereon, as indicated in Fig. 20. When this has been done, the pasting apparatus retires.

In order to prevent the pasting apparatus from pressing against the side of the machine when there is no bag to be pasted, a disengaging apparatus is provided, which maintains the pasting apparatus out of action under these conditions. With this object a small plunger $i^4$, acting as a feeler, is provided in a hollow formed in the thickness of the side plate X', being normally pressed upward by a spring $i^5$. This feeler is connected at its lower end with a projection or stop $i^3$. When a paper-bag blank is present between the carrying-bands C opposite the pasting mechanism, the feeler $i^4$ is depressed by the bag resting on its upper end, and the stop $i^3$ is thereby lowered to such an extent as to be clear of a corresponding stop on the rocking frame $g^6$ of the pasting attachment, so that the pasting-bands can be brought home against the bag-bottom. On the other hand, when there is no bag in the machine opposite the pasting apparatus, the feeler $i^4$ is pushed up by the spring $i^5$ into a recess $i^8$ in the under side of the upper side plate X', Figs. 10 and 11. The stop $i^3$ is consequently elevated and placed directly opposite the corresponding projection $g^8$ on the frame of the pasting apparatus, thereby rendering it impossible for the latter to come close up to the side plates X X'. Under these conditions the pasting apparatus is thus held out of action. It is evidently necessary to provide in combination with this arrangement means for pushing down the feeler $i^4$, in order that it may not project above the side plate X when a fresh blank is being fed into this division of the machine. This is accomplished as follows: At one side of the frame $g^6$ of the pasting apparatus there is pivoted in bearings attached to the plate X a bell-crank lever $i$, one arm of which engages with an eye or slot in a part $i^6$, connected with the feeler $i^4$, while the other arm engages with a pin $i^2$ on the rocking frame of the pasting apparatus. When by the rotation of the shaft A the cam $g$ is caused to act upon the roller $g'$ on the lever $g^2$ in such a manner that the pasting apparatus is pushed away from the side plates X of the machine, the bell-crank lever $i$ is rocked on its center in such a manner as to cause the eye $i^6$, connected to the feeler $i^4$, to be pulled down. Consequently each time that the pasting apparatus is pushed back the feeler is drawn down to its lowest position. This is the position indicated in Fig. 8. Figs. 10 and 11, on the other hand, show the feeler in the position which it occupies when there is no paper in the machine. Now, in order to crease or fold the paper which has received the paste, as aforesaid, in such a manner as to completely close the bottom of the bag, the blank is forwarded to the fourth division of the machine, where the bottom is further creased or folded in two places, and the folds are pressed by special pressing-plates, so that the paper bag finally receives the finished form represented in Figs. 22 and 22$^a$. This division of the machine is separately illustrated in longitudinal section in Fig. 12 and in plan in Fig. 13. The bag-blank is forwarded to this part of the machine by the carrying-bands, being stopped when in the correct position by means of a comb U, as hereinbefore explained.

The side plates X X' are provided at $k^7$, as indicated in elevation in Fig. 1 and in the sectional view, Fig. 12, with teeth or corrugations. A pair of claws or tuckers $k^6$, attached to the extremity of a lever $k^5$, reciprocates in front of these teeth, the claws or tuckers being intermittently pushed into the grooves between the teeth $k^7$ by the action of a series of levers operated by a cam $k$ on the driving-shaft A. This cam acts on a roller $k'$ on a slotted reciprocating bar $k^2$, the roller being normally pressed against the cam by the action of a spring $k^9$, connected to the frame. The bar $k^2$ is pivotally connected to a lever $k^3$, oscillating on the shaft E. The lever $k^3$ is connected with the two oscillating claw or tucker levers $k^5$ by rods or links $k^4$. (Indicated partly in dotted lines in Fig. 12.) At each revolution of the shaft A the claws $k^6$ are consequently forced into the grooves between the teeth $k^7$. A bag-blank which has been previously pasted in the pasting apparatus hereinbefore described being duly presented between the side plates X X', the claws are operated and crease the pasted folds, as indicated in Figs. 21 and 21$^a$. In order to form complete folds along the creases or lines thus produced, two presser-plates $l^6$ are provided, being alternately caused to act on the bag-bottom, so as to press down the folds in the form indicated in Figs. 22 and 22$^a$. These presser-plates are carried on the ends of bell-crank levers $l^5$, operated by levers $l^4$, actuated by a cam $l$ on the driving-shaft A. This cam acts upon a lever $l^2$, (shown partly in dotted lines in Fig. 12,) provided with a roller $l'$, serving to reduce the friction, and guided by a slot working on the shaft A. A spring $l^8$ maintains the lever $l^2$ constantly pressed against the cam $l$. The lever $l^2$ is connected to a quadrant-shaped piece $l^3$, to which the lever $l^4$ is hinged at an angle of about ninety degrees. An oscillating motion is thus imparted to the quadrant-shaped piece $l^3$ by the rotation of the cam $l$, and in consequence of the position of the center of oscillation of the lever $l^4$ the upper presser-plate $l^6$ is first brought into action and flattens the upper fold previously creased by the creasing mechanism. When this operation has been effectually performed, the lower presser-plate $l^6$ comes into action and presses the lower fold of the bag-bottom, which slightly overlaps the upper fold. The successive action of the presser-plates is obtained by so arranging the quadrant-piece $l^3$ at the commencement of its motion. The lower link or lever $l^4$, which transmits motion to the lower presser-plate, is on the center or dead point, while the lever controlling the upper plate is attached to the quadrant at about an angle of ninety degrees with this point. The presser-plates $l^6$ are so formed that the upper plate presents a recess in its lower edge, the other plate being provided with a projecting part of similar form corresponding with the overlapping part of the lower fold. The upper and lower presser-plates, being thus forced against the bag-bottom in succession, fit closely together at their edges and press the folds firmly against the side plates X X'. The pasted folds are thus effectually caused to adhere at the pasted parts, and the bag assumes the shape illustrated in Figs. 22 and 22$^a$. The formation of the bag-bottom is now completed, the bottom being of the hexagonal form indicated in Fig.

22 when flattened, as indicated in the drawings.

The combs U, which are employed in the several divisions of the machine hereinbefore described, oscillate on the shaft E by means of the lever-arm $a$ being actuated by a cam $a^2$ on the driving-shaft A, as described with reference to the first division of the machine.

It now simply remains to press out or flatten the bag for convenience of packing for carriage or storage. With this object the bag is gradually reduced from the form indicated in Figs. 22 and 22ª to that indicated in Fig. 23, and is finally completely flattened, as represented in Fig. 24. This is accomplished by the action of two plates, which turn over the bag-bottom with an action similar to that of the mold-board of a plow. This arrangement is drawn to a larger scale in Figs. 14 and 15. With this object a portion of the lower side plate X is removed at this part of the machine, so as to enable the bag-bottom to be straightened out by mechanism acting externally. Plates $n'$ and $n^2$ are used for the purpose, the plate $n'$ being screwed or otherwise suitably attached to the lower side plate X and the plate $n^2$ to the upper side plate X'. The upper plate $n^2$ is curved or twisted outward, so as to gradually change from a vertical to a horizontal plane projecting from the upper side plate X', and the lower plate $n'$ is similarly turned inward, as indicated in Fig. 14. To enable these plates to straighten out the bag, it is necessary to provide for the removal of the lower carrying-band at this end of the bag, which band would otherwise interfere with the operation. With this object the left-hand band C, Fig. 13, is drawn under a pulley $m$, so that the under side of the bag no longer rests upon this band, and room is provided for turning back the fold of the bottom against the under side of the bag. The bag, being thus folded and completely flattened, is now introduced between two endless pressing cloths or aprons G, Figs. 16 and 17, working on rollers H, Fig. 2, and serving to thoroughly press and flatten or smooth out the bag-bottom. These cloths are pressed between rollers R R, capable of being set closer together or farther apart, according to the pressure required. The carrying or forwarding bands or tapes C work over these endless cloths. The pressing mechanism is illustrated in Figs. 2, 14, 16, and 17. The endless cloths G are carried round the rollers J J, Fig. 2, receiving an intermittent motion, as hereinbefore described, from a toothed wheel $J^3$, and operating the carrying-bands C, as well as the cloths G. The tension of the said carrying-bands is maintained by means of weighted tension-rollers F, Fig. 1, working in vertical guides. The upper and lower carrying-bands travel from one end of the machine to the other in close proximity, so as to hold the bag between them and carry it regularly forward with a yielding pressure, so as to avoid forcing and crumpling the paper when the edge comes in contact with the combs U. The finished bags drop out from between the bands at the delivery end of the machine and fall into a suitable receptacle $p$, whence they are removed as often as may be necessary.

The rollers J J and H H are prolonged on one side of the machine, so as to enable the pressing-cloth to act on the extremity of the bag.

The several divisions of the machine are marked I, II, III, and IV in Fig. 1, the straightening-out mechanism being marked V, and the apparatus working the pressing-cloths is marked VI.

$W'$ $W^2$ $W^3$ represent the frame of the machine, and Z, Fig. 12, is a longitudinal plate or support on the opposite side to the side plates X X', and carrying bearings for one end of the rollers. Y is another longitudinal plate or support, and $W^4$, Fig. 17, is an outside bearing for the end of the shaft L. The functions of all the other essential parts of the machine are as hereinbefore described.

What I claim, and desire to secure by Letters Patent of the United States, is—

1. In a machine of the class described, the combination, with the feeding-tapes, of the clamping-jaws, wipers movable relatively to said jaws, and means for actuating said jaws and wipers.

2. In a machine of the class described, the combination, with the feeding-tapes, of the lower fixed jaw, an upper movable jaw, wipers movable upward and downward relatively to the jaws, and means for imparting motion to the jaws and wipers in the proper time.

3. In a bag-machine, the combination, with a frame, of the fixed and movable triangular jaws $b^4$, wipers $c^{10}$, movable toward and from and up and down relatively to the jaws, and mechanism for imparting proper motion to one of the jaws and the wipers.

4. In a bag-machine, the combination, with a frame, of the fixed jaw $b^4$ and the movable jaw $b^4$, a pivoted lever $b$, connected with and serving to actuate the movable jaw, plates $c^9$ $c^9$, provided with wipers $c^{10}$, to act in conjunction with the jaws, toggle-levers $c^6$ and $c^7$, rod $c^5$, connected with the toggle-levers, and means for imparting motion to the rod $c^5$ and lever $b$ in the order stated.

5. In a bag-machine, the combination, with a frame and the continuously-rotating shaft A, of a second shaft E, a fixed clamping-jaw $b^4$, a movable clamping-jaw $b^4$, a lever $b$, connected with the movable jaw, mounted upon the shaft E, and provided with an arm to bear upon a cam on shaft A, plates $c^9$ $c^9$, provided each with an upright wiper $c^{10}$, to act in conjunction with the jaws $b^4$, toggle-levers $c^6$ $c^7$, the former connected with one of the plates $c^9$, a slotted rod $c^5$, encircling shaft A and connected at its opposite end with one of the toggle-levers, and a cam on the shaft A adapted to actuate the rod.

6. In a paper-bag machine, the combination, with the fixed plate X, provided with a suction device, of a movable plate $b^3$, rollers $e^9$ and $f^7$, capable of movement upward and downward relatively to the plates $b^3$ and X, and a presser-plate $d^5$, all arranged substantially as shown.

7. In a paper-bag machine, the combination, with the fixed plate X, provided with a suction device, of a movable plate $b^3$, adapted to clamp the bag upon the plate X, a roller $e^9$, adapted to work over the face of the plate X, a roller $f^7$, adapted to work over the face of the plate $b^3$, a presser-plate $d^5$, adapted to cover the plates X and $b^3$, and mechanism, substantially such as shown, for causing the movements of the parts in order.

8. In a bag-machine, the combination, with the clamping-plates X and $b^3$, of a suction device applied to the plate X, a spring-pressed roller $f^7$, adapted to work over the face of the plate $b^3$, a main driving-shaft, a cam thereon, lever $f^5$, carrying the roller $f^7$, and lever $f^4$, actuated by the cam and connected with lever $f^5$.

9. In a bag-machine, the combination, with the clamping-plates X and $b^3$, of a suction device applied to the plate X, a spring-pressed roller $e^9$, working over the face of the plate X, a main driving-shaft provided with a cam, and mechanism actuated by the cam for imparting motion to the roller.

10. In a bag-machine, the combination, with the clamping-plates X and $b^3$, of a suction device applied to the plate X, reciprocating block $e^6$, provided with a spring-arm $e^7$ and link $e^5$, block $e^8$, secured to arm $e^7$ and provided with a roller $e^9$, lever $e^2$, pivoted to the frame, slotted arm $e^3$, and a cam or eccentric for imparting motion to the arm.

11. In combination with the clamping-plates X and $b^3$, the former provided with openings, tubes applied to said openings, a pump, a connection between the tubes and the pump, and a main shaft for imparting motion to the pump.

12. In combination with the clamping-plates X and $b^3$, the former provided with a suction device, a reciprocating roller $f^7$, adapted to move over the plate $b^3$, as and for the purpose set forth.

13. In a machine for the manufacture of paper bags, the combination, with a suitable frame, of a bag-holding device adapted to clamp and hold the bag-blank and to leave one end exposed, a pasting apparatus movable toward and from the end of the bag to be pasted, mechanism for moving the pasting apparatus toward and from the bag while the bag-holding mechanism is at rest, and a stop (such, for instance, as $i^3$) for preventing the pasting apparatus from coming into position to apply paste to the bag, the said stop being operated automatically by the bag, all substantially as shown, whereby unless a bag be in position to be pasted the pasting apparatus will be held out of action.

14. In a paper-bag machine, the combination, with the frame $g^6$, provided with two sets of wheels $h^6$ and $h^8$, and a paste-trough $h^{19}$, of a band $h^9$, passing about pulleys $h^6$, and bands $h^7$ $h^7$, passing about pulleys $h^8$, the bands $h^7$ and $h^9$ working in the paste in the trough.

15. In a machine for making paper bags, the combination, with a main frame and a bag-holding mechanism, of a pasting apparatus having a series of continuously-traveling bands and a paste-receptacle and hinged or pivoted to the frame, means for swinging the pasting apparatus upon its shaft, and a stop normally in position to prevent the pasting apparatus from coming into operative position.

16. In combination with the main frame, the pasting-frame $g^6$, pivoted thereto and provided with a lug $g^8$, continuously-traveling bands carried by said frame, a lug $i^3$, mounted in the main frame normally in alignment with the lug $g^8$ and adapted to be depressed by the bag, means for swinging the frame $g^6$, a wheel concentric with the pivot of frame $g^6$, for imparting motion to the bands, and a band for imparting motion to the wheel continuously.

17. In a paper-bag machine, the combination, with the frame X X', of the spring-pressed feeler $i^4$, arranged to project across the space between the two parts of the frame and to be depressed by the insertion of a bag-blank, a stop or lug $i^3$ upon the stem of the feeler, and a movable pasting mechanism provided with lug $g^8$, adapted to strike against the lug $i^3$ when the latter is not depressed by the bag-blank.

18. In a paper-bag machine, the combination, with the frame X X', of a pasting mechanism, the spring-pressed feeler $i^4$, having an eye $i^6$ at its lower end, and an elbow-lever $i$, engaging therewith and adapted, substantially as shown, to retract the feeler positively at each backward movement of the pasting mechanism.

19. In a paper-bag machine, the combination, with the frame provided with notches $k^7$, of the tucker $k^6$ and the flat presser-plate $l^6$, adapted to act in conjunction with the notched plate.

20. In a paper-bag machine, the combination, with the frames X X', separated, as shown, to receive the bag-blank and provided with notches $k^7$, of the pivoted claws $k^6$ and the pivoted presser-plates $l^6$.

21. In a paper-bag machine, the combination, with the frame, of the presser-plates $l^6$ $l^6$, a quadrant $l^3$, levers $l^4$, connected therewith at an angle to each other, and a cam adapted, substantially as shown, for imparting motion to the quadrant, whereby the lower presser-plate is brought into action after the upper plate.

22. In a paper-bag machine, the combination, with the frames X X', of the plates $n'$ $n^2$, secured, respectively, to the frames X X', one above the other, and curved in reverse directions to flatten out the bag.

23. In a paper-bag machine, the combination, with the main frame, of the main shaft provided with a cam, a pivoted lever $a$, and a vertically-reciprocating comb U, adjustable relatively to the lever.

In witness whereof I have hereunto set my hand in presence of two witnesses.

ADOLF WEIDENBUSCH.

Witnesses:
 ALVESTO S. HOGUE,
 JEAN GRUND.